United States Patent Office.

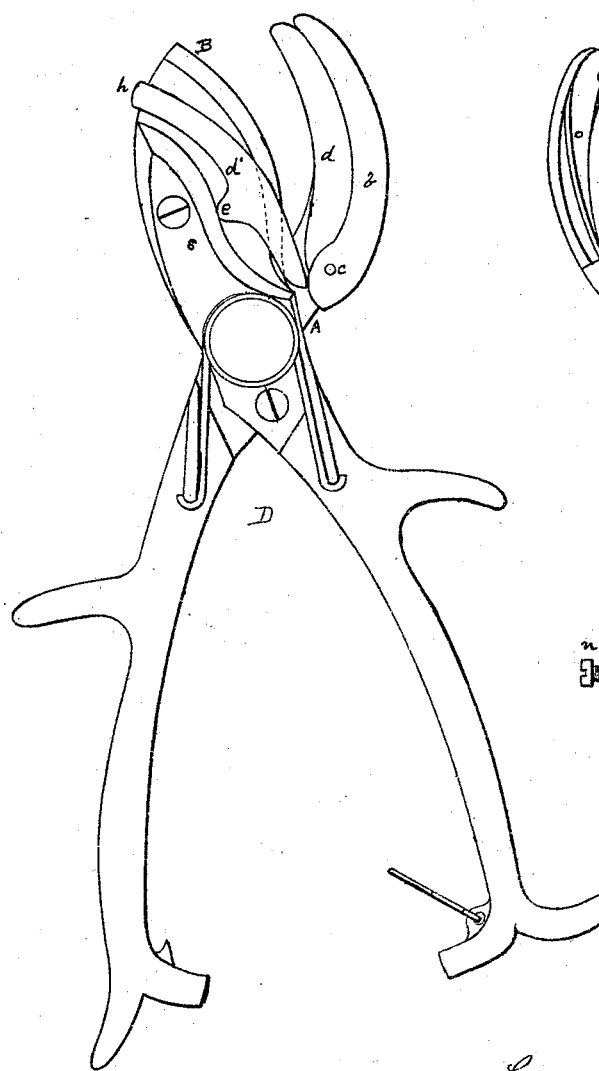

GEORG BERGNER, OF WASHINGTON, MISSOURI.

Letters Patent No. 106,538, dated August 23, 1870.

IMPROVEMENT IN PRUNING-SHEARS.

The Schedule referred to in these Letters Patent and making part of the same.

*To all whom it may concern:*

Be it known that I, GEORG BERGNER, of Washington, Franklin county, State of Missouri, have invented a new and useful Improvement in Pruning-Shears, of which the following is a full, clear, and exact description, reference being had to the annexed drawing making a part of this specification, in which—

Figure 1 represents a pair of shears having my improvement attached.

Figures 2 and 3 represent detached views of said improvement.

Similar letters indicate like parts.

My invention consists in an attachment for pruning-shears, by which, when the clipping is cut off, it may still be held by the shears, and prevented from dropping to the ground.

The shears D, fig. 1, show one form to which I propose to attach my improvement, and, for illustration merely, my description will be directed especially to this form.

A casing, $b$, figs. 1, 2, and 3, shaped to correspond to the blade A, has pivoted to it, at $c$, figs. 1 and 3, two blades or arms, $d\ d'$, figs. 1 and 2, $d'$, fig. 3, the latter having on one edge a stud, $e$, figs. 1, 2, and 3, and at its extremity a hook, $h$, figs. 1, 2, and 3.

Beneath $d$, and acting upon it, as seen, is a spring, $o$, fig. 2.

The casing has a slot, $m$, fig. 3, into which the blade A fits, and is there held by the thumb-screw $n$, figs. 2 and 3. The other blade, B, passes into the hook $h$, as seen in fig. 1.

Now, when the blades A and B are brought together, the arm $d'$ is, by the action of the plate $s$, fig. 1, on the stud $e$, forced down uniformly with it, till, meeting the twig to be cut, it presses it against the other blade $d$, holding it firmly, while the cutting-blade B passes on, severing the twig in the usual way, there being, of course, space left between the arm $d$ and the blade A, to allow the blade B to pass, so as to meet the blade A. The spring $o$ gives the arm $d$ the necessary elasticity during the operation.

This attachment will be found especially useful when picking grapes, or other fruit or flowers which it is desirable to save as much as possible from bruising, since, by its use, they are removed therefrom by the hand, or placed directly in the box or other receptacle.

This attachment, of course, is adapted to all instruments having the scissors movement, it only being necessary that the shape and size of the various parts should conform to that of the blades of the instrument with which they are to be used.

In pruning-shears as now generally constructed, the cutting-blade is attached to a plate like $s$, which affords the necessary projection for the stud $e$ to work against, but whenever the blade has not such plate of course its place must be supplied by attaching to it a substitute therefor, as a metal stud of the required outline, or, perhaps, making a groove in the blade, and forming the stud $e$ so as to run in it, or by other equivalent device.

What I claim as my invention, and desire to secure by Letters Patent, is—

1. The blades $d\ d'$, case $b$, and spring $o$, in combination with the blades A and B, and arranged, constructed, and operating jointly, as and for the purpose shown and specified.

2. As a new article of manufacture, an attachment for shears, composed of the blades $d\ d'$, case $b$, and spring $o$, arranged and constructed as and for the purpose specified.

GEO. BERGNER.

Witnesses:
SAML. S. BOYD,
LEWIS MYERS.